(No Model.)

E. L. HOWE.
FIFTH WHEEL.

No. 488,010.  Patented Dec. 13, 1892.

WITNESSES

INVENTOR
Eugene L. Howe
by W. Bakewell & Sons
his Attorneys.

UNITED STATES PATENT OFFICE.

EUGENE L. HOWE, OF CLEVELAND, OHIO.

FIFTH-WHEEL.

SPECIFICATION forming part of Letters Patent No. 488,010, dated December 13, 1892.

Application filed August 9, 1892. Serial No. 442,585. (No model.)

*To all whom it may concern:*

Be it known that I, EUGENE L. HOWE, of Cleveland, in the county of Cuyahoga and State of Ohio, have invented a new and useful Improvement in Fifth-Wheels, of which the following is a full, clear, and exact description, reference being had to the accompanying drawings, forming part of this specification, in which—

Figure 1:
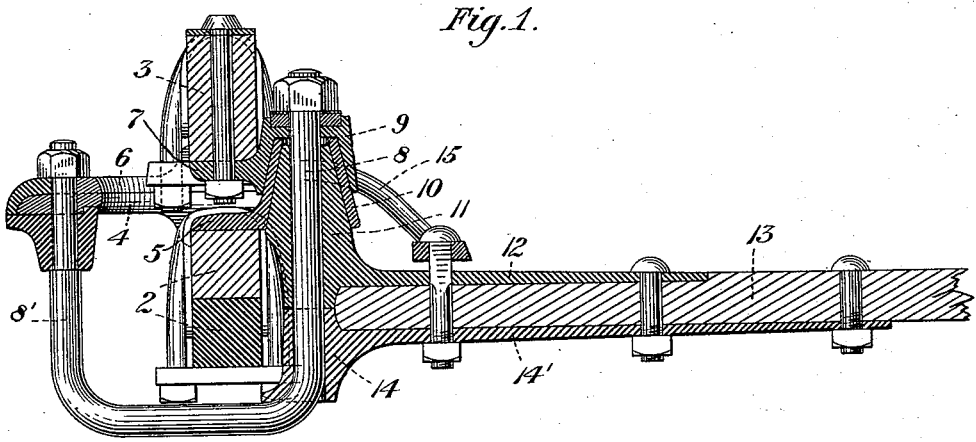
Figure 2:
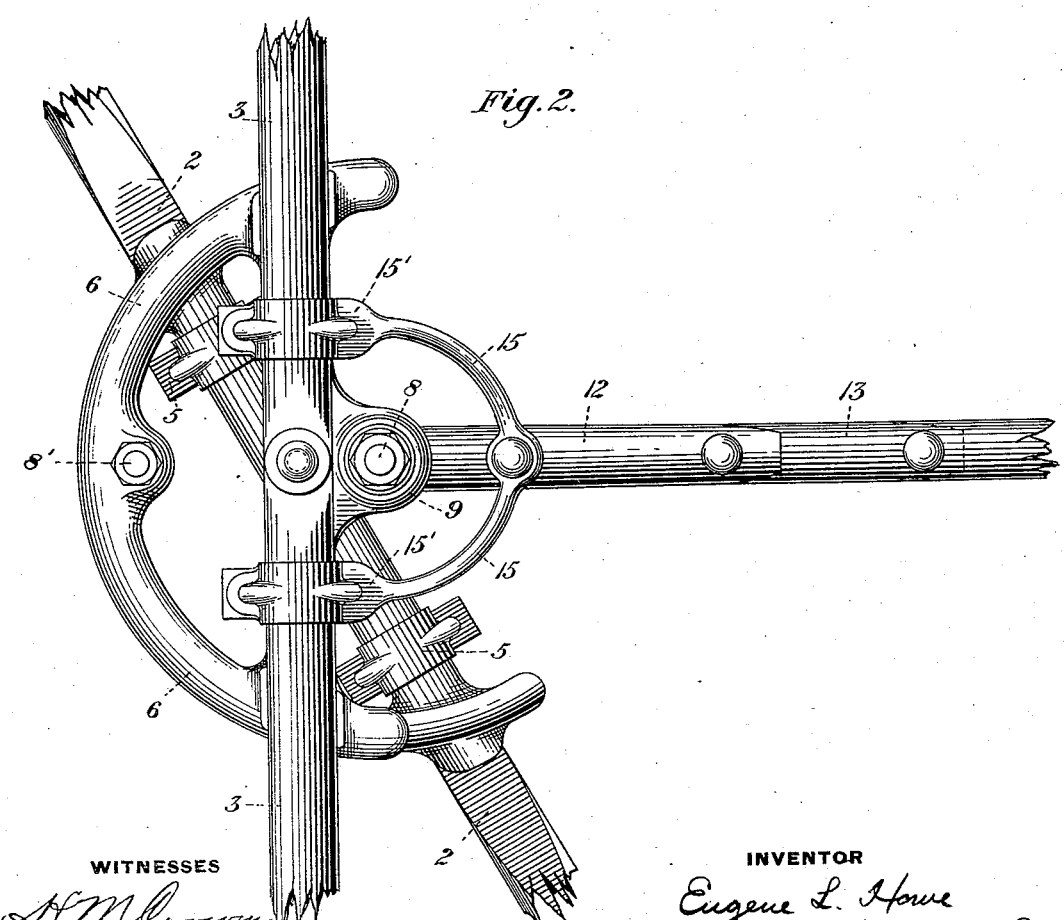

Figure 1 is a vertical central section of a fifth-wheel embodying my invention, and Fig. 2 is a plan view thereof.

Like symbols of reference indicate like parts in each of the figures.

The object of my invention is to improve and strengthen the construction of fifth-wheels; and it consists in a fifth-wheel having a king-bolt back of the axle, circle-plates, a sub-axle connection between the upper circle-plate and king-bolt, a king-bolt socket or collar having a rearward extension adapted to be secured to the perch, and braces extending from the upper circle-plate and adapted to be secured to the perch or to said rearward extension.

It also consists, more broadly, in a fifth-wheel having upper and lower circle-plates and brace-arms extending rearwardly from the upper circle-plate and secured to the perch.

In the drawings, 2 represents the front axle and axle-bed of a vehicle, and 3 is the head-block.

4 is the lower circle-plate, secured to the axle-bed by a saddle 5.

6 is the upper circle-plate, secured to the under side of the head-block by a saddle 7.

8 is the king-bolt, having a brace 8', which may be made integral with the king-bolt and which extends forward beneath the axle and is attached to the upper circle-plate.

9 and 10 are collars, which project, respectively, from the upper and lower saddles 5 and 7 and encircle the king-bolt.

11 is a socket or collar encircling the king-bolt, fitting around the same within the collar 10 and having a rearward extension 12, constituting the perch-iron and fixed to the perch 13, and a collar 14, preferably made in a separate piece from the collar 11 and situate below the same, has a rearward extension 14', also forming part of the perch-iron.

The saddle of the upper circle-plate has projecting arms 15, which extend downwardly and rearwardly from clip-plates 15' on intermediate parts of the saddle and unite at their ends, having a bolt-hole affording means by which they can be secured to the perch-iron by a bolt passing through the latter and through the interposed perch. This brace, as part of a novel combination, constitutes the important feature of my invention. It strengthens the wheel and coacts with the sub-axle brace and king-bolt socket 11 to form a perfectly-balanced and well-braced structure, the brace-arms connecting the upper circle-plate to the perch and the part 12 connecting the king-bolt and lower circle-plate with the perch and indirectly through the brace-arms with the upper circle-plate.

Without limiting myself strictly to the described construction and arrangement of the parts, which may be modified somewhat without variance from the scope of my invention as summarized in the following claims, I claim as my invention—

1. A fifth-wheel having circle-plates and a king-bolt back of the axle and brace-arms extending rearwardly from clip-plates at intermediate portions of the upper circle-plate and adapted to be secured to a perch, substantially as and for the purposes described.

2. A fifth-wheel having circle-plates, a king-bolt back of the axle, a sub-axle connection between the upper circle-plate and king-bolt, a king-bolt socket or collar interfitting with a collar of the circle-plate and having a rearward extension adapted to be secured to the perch, and brace-arms extending from the upper circle-plate and adapted to be secured to the perch or to said rearward extension, substantially as and for the purposes described.

In testimony whereof I have hereunto set my hand this 5th day of August, A. D. 1892.

EUGENE L. HOWE.

Witnesses:
MARTIN O. SENSENY,
EMIL W. JAITE.